(12) United States Patent
Stowe

(10) Patent No.: US 9,303,134 B2
(45) Date of Patent: Apr. 5, 2016

(54) RECYCLING OF SOLID WASTE IN IONIC LIQUID MEDIA

(71) Applicant: ECOsight, LLC, Colorado Springs, CO (US)

(72) Inventor: Darren Stowe, Del Rio, TX (US)

(73) Assignee: ECOSIGHT, LLC, Colorado Springs, CO (US)

( * ) Notice: Subject to any disclaimer, the term of this patent is extended or adjusted under 35 U.S.C. 154(b) by 190 days.

(21) Appl. No.: 13/683,443

(22) Filed: Nov. 21, 2012

(65) Prior Publication Data
US 2013/0129602 A1 May 23, 2013

Related U.S. Application Data

(60) Provisional application No. 61/562,617, filed on Nov. 22, 2011.

(51) Int. Cl.
*C09C 1/48* (2006.01)
*C08J 11/28* (2006.01)
*C10B 57/06* (2006.01)

(52) U.S. Cl.
CPC ............... *C08J 11/28* (2013.01); *C09C 1/482* (2013.01); *C09C 1/487* (2013.01); *C10B 57/06* (2013.01); *C08J 2319/00* (2013.01); *Y02W 30/706* (2015.05)

(58) Field of Classification Search
CPC .......... C09C 1/482; C09C 1/487; C10B 57/06
USPC ................. 423/449.7; 201/2.5, 3, 20; 585/241
See application file for complete search history.

(56) References Cited

U.S. PATENT DOCUMENTS

| | | | | |
|---|---|---|---|---|
| 3,886,088 | A | * | 5/1975 | DeJong ........................ 502/423 |
| 5,827,602 | A | | 10/1998 | Koch et al. |
| 7,772,293 | B2 | | 8/2010 | Whiston |
| 8,865,017 | B2 | * | 10/2014 | Krishnan et al. ............. 252/79.1 |

OTHER PUBLICATIONS

Absolute Astronomy. http://www.absoluteastronomy.com/topics/Vulcanization (Apr. 2011).
Piccsy. http://piccsy.com/2010/04/tire-yard---manufactured-landscapes/ (Apr. 2011),1 page.
Author Unknown "The Use of Ionic Liquids for Separation of Tire Components": http://www.flintbox.com/public/project/5796/ Jan. 10, 2011, 1 page.

* cited by examiner

*Primary Examiner* — Stuart Hendrickson
(74) *Attorney, Agent, or Firm* — Stuart H. Mayer; Mayer & Williams PC

(57) ABSTRACT

A method for recycling rubber tires includes mixing the rubber tires and a hydrophobic ionic liquid in a vessel. The hydrophobic ionic liquid is heated to an elevated vapor temperature to produce dissolved components from the rubber tires. A precipitate is produced from at least some of the dissolved components.

9 Claims, 1 Drawing Sheet

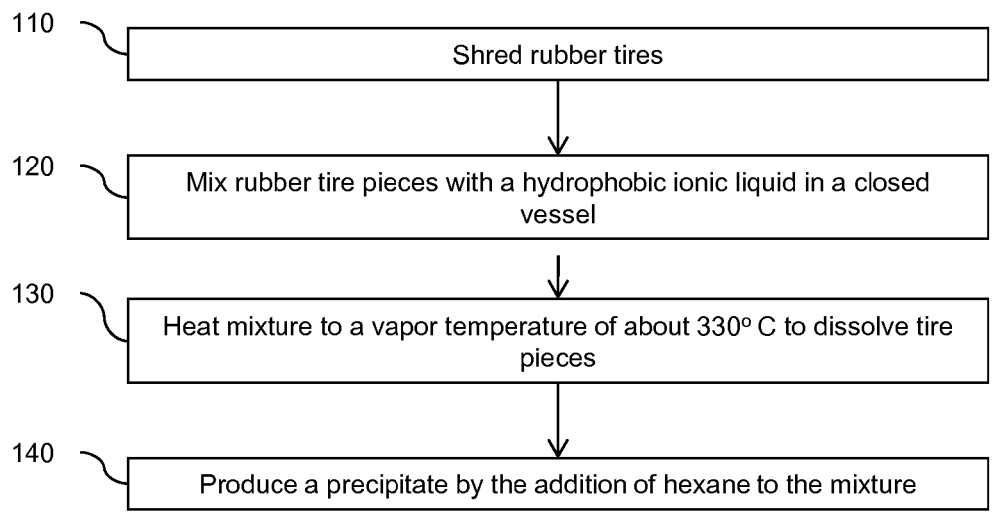

RECYCLING OF SOLID WASTE IN IONIC LIQUID MEDIA

RELATED APPLICATION

This application claims priority from U.S. provisional application 61/562,617, filed Nov. 22, 2011, which is incorporated by reference herein in its entirety.

GOVERNMENT FUNDING

This invention was made in the performance of a Cooperative Research and Development Agreement with the Department of the Air Force. The Government of the United States has certain rights to use the invention.

BACKGROUND

Disposing of vulcanized polymers represents a significant solid waste problem. Polymers that have been vulcanized have long been deemed as "permanent" or "irreversible". This is due to the crosslinking of polymer chains, creating a rubber that no longer melts, but instead disintegrating at high temperatures.

One particular type of vulcanized polymer that presents a significant disposal problem is rubber tires. For instance, according to the California Integrated Waste Management Board Report, people in California wear out roughly 28 million tires per year. Across the country, there are altogether about 240 million old tires which are replaced each year. Commonly employed methods of disposal include incineration and discarding in landfills. Both approaches have significant problems. For instance, the incineration of rubber tires releases large quantities of pollutants, which inevitably increases the problem of air pollution in the region. Discarding of rubber tires in landfills is also problematic because they are not easily degradable, making them less than suitable for disposal in landfills.

Recently, ionic liquids have been explored for their potential use in recycling vulcanized polymers such as rubber tires. Ionic liquids are known for their nonvolatility and stability at high temperature making them suitable for consideration in a low emission recycling system.

SUMMARY

In accordance with one aspect of the invention, a method is provided for depolymerizing a vulcanized polymer. The method includes contacting the vulcanized polymer with a hydrophobic ionic liquid and heating the hydrophobic ionic liquid to an elevated vapor temperature to produce dissolved components from the vulcanized polymer. The dissolved components from the ionic liquid.

In accordance with another aspect of the invention, a method for recycling rubber tires includes mixing the rubber tires and a hydrophobic ionic liquid in a vessel. The hydrophobic ionic liquid is heated to an elevated vapor temperature to produce dissolved components from the rubber tires. A precipitate is produced from at least some of the dissolved components.

BRIEF DESCRIPTION OF THE DRAWINGS

FIG. 1 is a flowchart showing one example of a method recycling rubber tires.

DETAILED DESCRIPTION

It has been found that certain ionic liquids can be used as solvents in effecting the depolymerization of vulcanized polymers such as rubber tires. In particular, the components of vulcanized polymers can be recovered with the use of hydrophobic ionic liquids as a solvent. One example of a hydrophobic ionic liquid that may be employed as a solvent is $[(C_6H_{13})_3C_{10}H_{21}P]^+ [(CF_3SO_2)_2N]^-$, which is commercially available and known by the abbreviation RyPTf2N.

In a generally applicable method to depolymerize vulcanized polymers the following procedure may be used. The vulcanized rubber is mixed with the hydrophobic ionic liquid in a sealed vessel and heated to an elevated temperature. In one embodiment the mixture is heated to a vapor temperature exceeding 175° C., more specifically to a vapor temperature exceeding 300° C. and more specifically still to a vapor temperature equal to or exceeding 330° C. The vulcanized rubber is depolymerized while at this elevated temperature, dissolving in the hydrophobic ionic liquid.

The dissolved components of the vulcanized rubber can be separated from the ionic liquid in a number of different ways. For example, a precipitate can be formed in the ionic liquid by the addition of a suitable substance to the mixture. One example of a substance may be a non-polar organic material such as hexane. This process renders a gooey-type tar residue that reacts with the hexane to render precipitate at the bottom of the vessel. The residue that is obtained includes about 80% carbon (similar to carbon black), 10% oxygen, with the remaining including calcium and silicon.

Ionic liquids with hydrophobic anions and cations allow for the material to be broken down. The hydrophobic nature of such liquids lets organic solvents out, including hexane. This allows for the separation of the ionic liquid/polymer in one container and the water/carbon black in another. The hydrophobic nature of the ionic liquid is thus important to retrieving and separating the carbon black.

FIG. 1 is a flowchart showing one example of a method for recycling rubber tires. The method begins at 110 when the one or more rubber tires are shredded or otherwise cut up into convenient size pieces. At 120 the rubber tire pieces are mixed with a hydrophobic ionic liquid in a closed vessel. The hydrophobic ionic liquid may be $[(C_6H_{13})_3C_{10}H_{21}P]^+ [(CF_3SO_2)_2N]^-$. Next, at 130 the mixture is heated to a vapor temperature of about 330° C. and the tire pieces are allowed to dissolve. The constituents of the rubber tires are recovered at 140 by producing a precipitate by the addition of hexane to the mixture, which can then be filtered to recover the solid material.

The foregoing disclosure constitutes a description of specific embodiments illustrating how the invention may be used and applied. Such embodiments are only exemplary. The invention in its broadest aspects is further defined in the claims which follow. These claims and terms used therein are to be taken as variants of the invention described. These claims are not restricted to such variants but are to be read as covering the full scope of the invention implicit within the disclosure herein.

The invention claimed is:

1. A method for depolymerizing a vulcanized polymer, comprising:
    contacting the vulcanized polymer with a hydrophobic ionic liquid, wherein the hydrophobic ionic liquid includes $[(C_6H_{13})_3C_{10}H_{21}P]^+ [(CF_3SO_2)_2N]^-$;
    heating the hydrophobic ionic liquid to a temperature that produces produce components from the vulcanized polymer; and
    separating the components from the ionic liquid, wherein separating the components from the ionic liquid includes producing a precipitate from at least some of the components and producing the precipitate includes adding hexane to the hydrophobic ionic liquid.

2. The method of claim 1 wherein the temperature exceeds 300° C.

3. The method of claim 1 wherein the temperature exceeds 330° C.

4. The method of claim 1 further comprising heating the hydrophobic ionic liquid to the temperature in a closed vessel.

5. A method for recycling rubber tires, comprising:
mixing the rubber tires and a hydrophobic ionic liquid in a vessel, wherein the hydrophobic ionic liquid includes $[(C_6H_{13})_3C_{10}H_{21}P]^+ [(CF_3SO_2)_2N]^-$;
heating the hydrophobic ionic liquid to a temperature that produces components from the rubber tires;
producing a precipitate from at least some of the components, wherein producing the precipitate includes adding hexane to the hydrophobic ionic liquid.

6. The method of claim 5 further comprising filtering the precipitate from the hydrophobic ionic liquid.

7. The method of claim 5 wherein the temperature exceeds 300 C.

8. The method of claim 5 wherein the vapor temperature exceeds 330 C.

9. The method of claim 5 further comprising heating the hydrophobic ionic liquid to the temperature in a closed vessel.

\* \* \* \* \*